Dec. 13, 1932.  A. A. BULL ET AL  1,890,842
ELECTRIC SWITCH
Filed Jan. 26, 1931
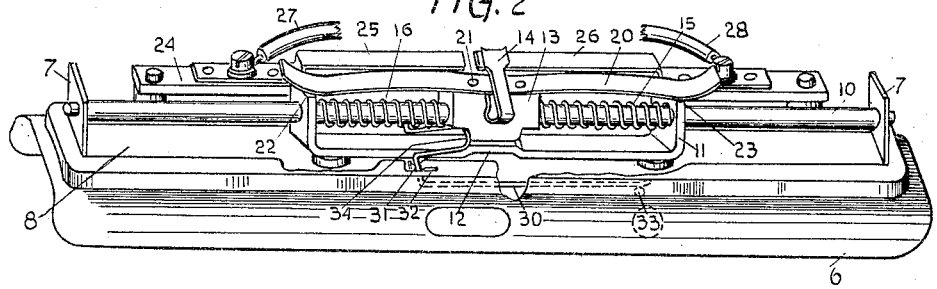
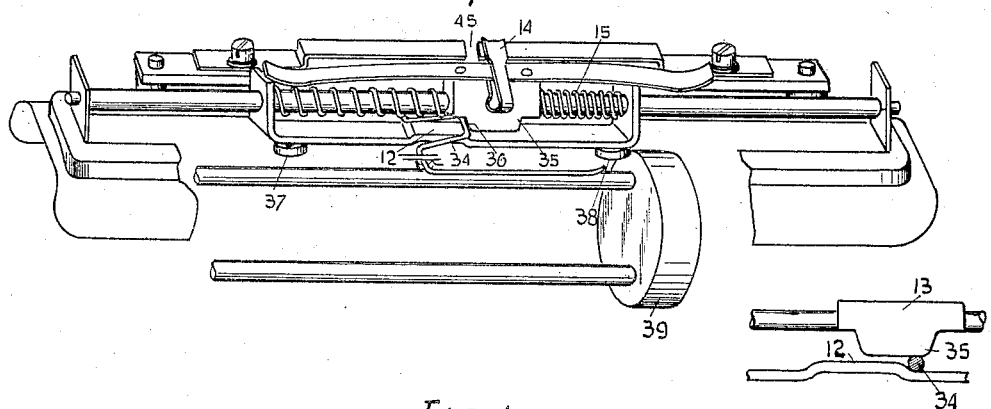
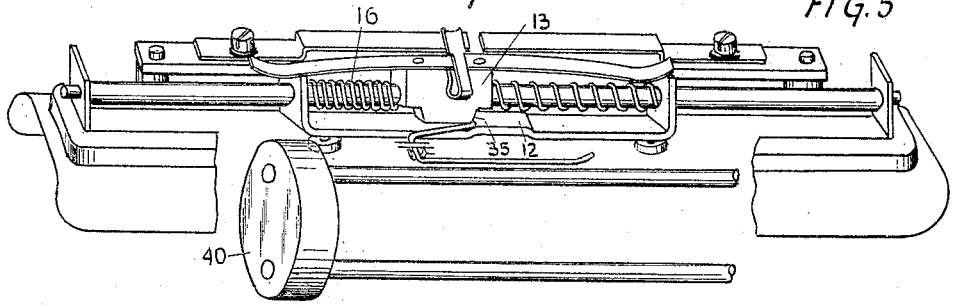
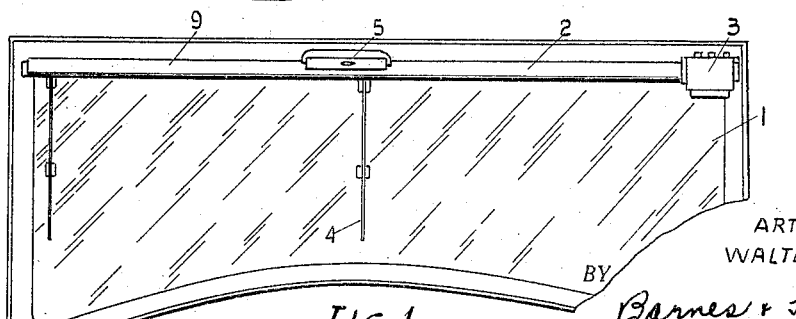
INVENTOR.
ARTHUR A. BULL
WALTER A. WOOD
BY Barnes + Kisselle
ATTORNEYS.

Patented Dec. 13, 1932

1,890,842

UNITED STATES PATENT OFFICE

ARTHUR A. BULL AND WALTER A. WOOD, OF DETROIT, MICHIGAN, ASSIGNORS TO HANDY GOVERNOR CORPORATION, OF DETROIT, MICHIGAN, A CORPORATION OF MICHIGAN

ELECTRIC SWITCH

Application filed January 26, 1931. Serial No. 511,227.

This invention relates to an electric reversing switch. It is an object of this invention to produce a reversing switch, the reversing action of which is instantaneous. This object is achieved by means of a sliding contact which is temporarily latched to effect a storage of energy in the shifting mechanism, and upon the release of the latched sliding contact the stored energy is expended quickly to effect a substantially instantaneous throw of the sliding contact to reverse the current flow.

The usual snap-over center switch for producing an instantaneous switching action, is here replaced by a sliding contact switch, which is better adapted for operation by a sliding windshield wiper element.

In the drawing:

Fig. 1 is an elevation of a windshield and an associated electric windshield wiper showing a specific application of this novel switch to an electric windshield wiper.

Fig. 2 is a perspective view partly broken away of the switch unit with the energy-storing operating springs at rest.

Fig. 3 is a view similar to that shown in Fig. 2 in which one of the operating springs is fully compressed and about to discharge its energy to throw the sliding contact.

Fig. 4 is a view similar to Fig. 3 in which the sliding contact has been thrown to reverse the flow of current and the left hand spring has been compressed and is about to discharge its energy and throw the sliding contact back to the position shown in Fig. 2.

Fig. 5 is a fragmentary detail showing the relative position of the contact, latch, and latch cam just after the latch has been released.

Referring more particularly to the drawing, in Fig. 1 there is shown a windshield 1 which has mounted thereon and in operative relation therewith, the windshield wiper 2 which is operated by the electric motor 3. This specific type of windshield wiper is shown and claimed in our copending application filed January 26, 1931, Serial No. 511,226. The motor 3, through a suitable worm and associated mechanism, reciprocates the wiping blades 4. This reciprocation is effected by a reversal of the motor. This reversing of the motor is effected by the reversing switch 5 which is the particular invention herein described and claimed. It is understood that this reversing switch 5 is not limited in its application to a reciprocating electric windshield wiper but it is merely shown in this environment for descriptive purposes only.

The switch proper is mounted upon a suitable support plate such as the stamp metal plate 6 which has the upstanding lugs 7 and the longitudinal slot 8. The support plate 6 is in turn secured to the tubular casing 9 by the windshield wiper. The upstanding lugs 7 support the guide rod 10 which serves as a supporting guide for the sliding contact and associated mechanism. The guide rod 10 has threaded and slidably mounted thereupon the U shaped member 11 which has the raised cam portion 12. There is also slidably mounted upon the guide rod 10 and between the upturned ends of the U shaped member 11, the sliding support member 13 for the sliding contact 14.

Threaded upon the guide rod 10 between the support member 13 and each of the upturned ends of the cam member 11 are the coil springs 15 and 16. The sliding contact 14 along with the elongated flat spring 20 is suitably fixed upon the member 13 by the rivets 21. The ends of the flat spring yieldably and slidably engaging the upturned portions of the U member 11 as at 22, 23. The base plate 6 has mounted thereupon the insulating strip 24 which in turn has mounted thereupon the spaced contacts 25 and 26 which are connected to the motor 3 by the wires 27 and 28, respectively. The sliding contact 14, spring 20, the guide rod 10, and the base plate 6 are made out of any good conducting material such as copper, brass, or sheet iron and hence contact with the windshield wiper tube 9 to suitably ground the circuit.

Since it is an object of this invention to provide a reversing switch that is instantaneous in action, to this end the contact support 13 is arranged to be temporarily latched by means of the spring wire latch member generally designated 30. This latch member 30 is pivoted upon the underside of the base plate 6, as at 31, by the struck-out tongues 32. It has the extension portion which is snapped behind and held in position by, the indentation 33. The latch spring member 30 has the U shaped portion 34 which pivots, as at 31, to serve as a latch for the slide contact support member 13.

The sliding contact support member 13 is provided with the cam shoulders 35 and 36. As is nicely brought out in Fig. 5, the bottom face of the member 13 is spaced above the U shaped member 11, a distance less than the diameter or thickness of the wire latch member 34. The U shaped member 11 has positioned beneath and adjacent each end thereof, the projecting abutments 37 and 38, respectively. These abutments are arranged to be alternately engaged by the slides 39 and 40 of the reciprocating windshield wiper mechanism, as it traverses back and forth in a manner similar to that described in our copending application referred to above. The abutments 37 and 38 are preferably cushioned with rubber to make the operation silent.

The operation of the switch is as follows: In Fig. 2 both of the slide members 39 and 40 are out of contact with the abutments 38 and 37, respectively. Assuming that the windshield carrier mechanism and associated slide is traveling from the left to the right, the slide 39 engages the abutment 38 and carries the U shaped member 11 and associated cam 12 to the left. At this time the latch 34 abuts the shoulder 36 of the member 13 and holds the member 13 stationary thus causing the spring 15 to be compressed. As the cam 12 moves to the left, latch 34 is swung upwardly into abutting relation with the face 36 and held there until the cam surface 12 reaches the position shown in Fig. 3, and at which time the latch 34 is about ready to release. Upon further leftward movement of the cam 12, the spring latch 34 is pressed downwardly by the cam action of the shoulder 36 so that the member 13 is free to be shifted to the left by the energy stored up in the compressed ring 15. This quick release of the latch 34 and instantaneous expansion of the spring 15 causes the sliding contact 14 to instantly snap past the gap 45 between the contacts 25 and 26, thus instantly reversing the flow of the current without creating an arc.

Upon the current being reversed the motor is reversed and consequently the slide member 40 and associated wiping mechanism begins to travel toward the right. At this time the contact support 13 is held stationary by the latch 34 causing the spring 16 to be compressed, owing to the movement toward the right of the slide 40, until the slide 40 reaches the position shown in Fig. 4. At this time the cam surface 12 is substantially past the cam shoulder 35, hence the stored-up energy in the spring 16 causes the cam shoulder 35 to cam the latch 34 downwardly to the position shown in Fig. 5 and permit the member 13 to snap to the right and the associated slide contact 14 to snap across the gap 45 to the position shown in Fig. 2 whereupon the cycle is again repeated. It will be noted that the flat spring 20 at all times forms a good electrical contact with the upturned ends of the U members at 22 and 23.

From the above description it is evident that there is herein described a reversing switch essentially characterized by a shifting contact that is temporarily latched against shifting and which has associated therewith shifting mechanism for temporarily storing up energy which is expended very quickly upon the release of the latched shifting contact to effect a substantially instantaneous shifting of the contact and reversing of the current.

What I claim is:

1. In a switch a snap mechanism comprising a reciprocating member having a cam surface, means for reciprocating the said member, a reciprocating cam member having a surface opposed to the aforesaid reciprocating member, and a pivoted latch adapted to be pivoted into abutting latching relation with the reciprocating member by the opposed cam member and held in abutting relation by the surface of the opposed cam member, the cam surface of the reciprocating member being adapted to release the latch after it has traversed the surface of the opposed cam member.

2. In a switch a snap mechanism comprising a reciprocating member having a cam, a pair of springs for reciprocating the said member, a reciprocating member opposed to the aforesaid reciprocating member and having a cam shoulder and a surface, and a pivoted latch member adapted to be raised into abutting latching relation with the first reciprocating member by the cam shoulder and held in latching relation by the surface of the second reciprocating member, the cam of the first reciprocating member being adapted to release the pivoted latch after it has been held in abutting relation by the surface of the second reciprocating member.

3. In a switch a snap mechanism comprising a support, a reciprocating member having a cam surface and adapted to carry a contact, a second reciprocating member having a cam shoulder and surface, the said first and second reciprocating members being adapted to reciprocate relative to the fixed member and to each other, and a latch member adapted to be placed and held in abutting relation with the first reciprocating member by the cam shoulder and surface of the second reciprocating member and adapted to be released by the cam surface of the first member.

In testimony whereof we affix our signatures.

ARTHUR A. BULL.
WALTER A. WOOD.